Patented June 6, 1950

2,510,885

UNITED STATES PATENT OFFICE 2,510,885

AMINE-EPOXY-PHENOL COMPOSITIONS

Sylvan Owen Greenlee, Louisville, Ky., assignor to Devoe & Raynolds Company, Inc., Louisville, Ky., a corporation of New York No Drawing. Application March 8, 1946, Serial No. 653,153

12 Claims. (Cl. 260—2)

This invention relates to new plastic compositions and products, which are valuable for use in the manufacture of varnishes and coating compositions, molding compositions, adhesives, films, molded articles, etc.

The invention includes the new compositions and products, and methods for their production.

The new compositions are made of mixtures of polyhydric phenols, amines, and polyepoxides in regulated proportions, which are reacted to form complex reaction products, the reaction taking place by direct addition reactions and without the formation of undesirable by-products. The invention includes compositions of the reacting materials as well as partial and final reaction products therefrom.

In my prior application Serial No. 617,177 filed September 18, 1945, I have described new complex amine-epoxide compositions made by reacting amines with complex epoxides which are themselves produced by the reaction of polyhydric phenols with polyfunctional halohydrins or with polyepoxides to form complex reaction products containing terminal epoxide groups.

The present invention relates to new compositions made by admixing and reacting polyepoxides with both amines and polyhydric phenols and to compositions for use in making such reaction products.

One of the objects of the invention is the production of new reaction mixtures containing polyepoxides, polyfunctional phenols and amines which will react through direct addition reactions of epoxide groups with amine and with phenolic hydroxyl groups to form complex plastic compositions.

Another object of the invention is the production of reaction mixtures of polyhydric phenols, amines and polyepoxides in proportions capable of reacting by direct addition reactions of epoxide with amine and phenolic hydroxyl groups to form complex plastic compositions.

Another object of the invention is the production of partial reaction products of polyepoxides and polyfunctional phenols and amines which are capable of further reaction to form final reaction products and particularly infusible products obtained by further heating of the intermediate reaction products.

Another object of the invention is the production of infusible products by heating in the presence of a catalyst or without a catalyst of polyfunctional reactants containing epoxide, amine and phenolic hydroxyl groups in such proportion that infusible products are obtained.

Another object of the invention is the production of complex polymeric products by the reaction of mixtures of polyhydric phenols and amines with polyepoxides in proportion such that polymeric chains are formed containing a plurality of polyhydric phenol residues and amine residues united through polyhydroxy containing nuclei from polyepoxides and with terminal epoxy-hydroxy containing groups.

Another object of the invention is the production of compositions containing polyhydric phenols, amines and polyepoxides in proportions suitable for reaction by direct addition and without the formation of byproducts to form infusible resins, films, molding compositions, etc.

Another object of the invention is the production of intermediate reaction products of polyfunctional phenols and amines with polyepoxides which are capable of further reaction to form insoluble, infusible products, and the preparation of higher molecular weight and more complex compositions from such lower molecular weight intermediate reaction products.

Another object of the invention is the production of complex, polymeric reaction products of polyfunctional phenols and amines with polyepoxides, said complex reaction products having terminal epoxide groups and intermediate hydroxyl groups and being capable of reaction to form final insoluble, infusible products.

Another object of the invention is the production of films, articles, molded products, and other final reaction products of outstanding properties from such polyepoxide compositions.

Another object of the invention is the production of reaction mixtures and reaction products from polyfunctional amino phenols and polyepoxides in suitable proportions for reaction to form final plastic compositions or intermediate compositions capable of further reaction to form such final compositions.

Other objects of the invention will appear from the following more detailed description.

The new compositions are made from polyepoxides by reaction with polyfunctional amines and phenols, and particularly from polyepoxides, polyhydric phenols and amines, which are admixed and caused to react with each other in forming the intermediate and final products. Depending upon the proportions of reagents, products of varying characteristics and properties can be produced.

The epoxide groups of the polyepoxides will react by direct addition reactions with phenolic hydroxyls and with amino groups to form addition reaction products. The epoxide groups are also capable of reaction with alcoholic hydroxyl groups contained in the intermediate reaction products. By starting with proportions of polyepoxide, polyhydric phenol and amine with the polyepoxide in sufficient excess, intermediate reaction products can be produced which contain terminal epoxide groups capable of further reaction with alcoholic hydroxyl or other reactive groups in forming the final reaction products.

Various polyfunctional phenols, amines and polyepoxides can be used in making the new compositions and products.

The polyhydric phenols used in making the new products and compositions include phenols containing two or more phenolic hydroxyl groups which may be in one nucleus as in resorcinol or in different nuclei of fused ring systems as in 1,5-dihydroxy naphthalene, or in different nuclei of ring systems attached by chains composed of one or more atoms in which case the chains should be free from elements which interfere with the reaction of the polyepoxides with the phenolic hydroxyl groups or with the amine hydrogens. The phenolic nuclei or the chains linking phenolic nuclei may contain substituents providing they do not interfere with the desired reactions.

Illustrative of polyhydric phenols which may be used in making the new complex polymerization products are mono-nuclear phenols such as resorcinol, hydroquinone, catechol, phloroglucinol, etc. and polynuclear phenols such as bis phenol (p,p'-dihydroxy diphenyl dimethyl methane), p,p'-dihydroxy benzophenone, p,p'-dihydroxy diphenyl, p,p'-dihydroxy dibenzyl, bis-(4-hydroxy phenyl) sulfone, 2,2'-dihydroxy 1,1'-dinaphthyl methane, polyhydroxy naphthalenes and anthracenes, o-p, o'-p'-tetrahydroxy diphenyl dimethyl methane and other dihydroxy or polyhydroxy diphenyl or dinaphthyl dialkyl methanes, etc.

The polyhydric phenols may themselves be complex reaction products, e. g. of 2 mols of a dihydric phenol with 1 mol of a diepoxide, or of 3 mols of a dihydric phenol with 2 mols of a diepoxide, etc. and containing free phenolic hydroxyls on each terminal dihydric phenol nucleus. More complex and higher polymeric products resulting from the reaction of, e. g., dihydric phenol with less than the equivalent amount of diepoxide to give reaction products containing terminal phenolic hydroxyl groups, can similarly be used.

The polyhydric phenols may also be complex reaction products of simpler polyhydric phenols, such as bis phenol, with dichlorides such as dichlordiethyl ether, dichlorbutene, etc., in the presense of caustic soda and in proportions so that the resulting reaction products will contain terminal phenolic hydroxyl groups. Thus a complex polyhydric phenol may be produced from bis phenol with dichlordiethyl ether and caustic alkali which may be assumed to have the following formula:

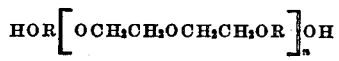

in which R is the residue from bis phenol and $n$ indicates the degree of polymerization which may be, e. g., 1, 2, etc. Complex polyhydric phenols from, e. g., bis phenol and dichlorbutene with the use of caustic alkali may be assumed to have the following general formula:

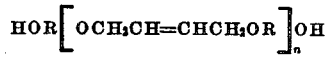

in which R and $n$ have the meaning indicated above. The complex polyhydric phenols thus produced, from dichlorides and simpler polyhydric phenols, are more complex or polymeric products in which, e. g., two simpler dihydric phenol residues are united through a residue from the dichloride. With less than two molecular proportions of the simpler dihydric phenol to one of the dichloride, and with the simpler dihydric phenol used in excess of the dichloride, a polymeric product is produced in which, e. g., 3 mols of dihydric phenol are reacted with 2 mols of dichloride; or to give products of a higher degree of polymerization.

The polyfunctional amines and phenols may in some cases be amino phenols containing one or more phenolic hydroxyl groups and one or more amine groups containing at least one active hydrogen. Both the phenolic hydroxyl group and the amine group with at least one active hydrogen can react with epoxide groups of the polyepoxides by direct addition.

Various polyfunctional amines containing active hydrogen, and particularly primary amines or polyfunctional amines, are useful in making the new polyhydric phenol-amine-epoxy compositions and products. Tertiary amines which do not contain active hydrogen are not included; only polyfunctional amines containing active hydrogen are included. Apparently all hydrogens attached to nitrogen are active hydrogens in reacting with the epoxide groups but amines vary in their reactivity with the epoxides. Aliphatic amines are more active than aromatic amines and cyclic amines of the aminodiazine and aminotriazine series. With certain of the less active amines it is desirable and advantageous to add catalysts such as traces of basic material to facilitate reaction. However, with some of the more basic amines such as the polyethylene polyamines no catalysts are necessary to carry the reaction to completion. With such amines as melamine and naphthylamine catalysts are advantageously used when infusible products are desired.

Polyamines and particularly aliphatic polyamines are especially advantageous. Thus, in the case of polyethylene polyamines such as diethylene triamine, tri-ethylene tetramine, etc., a number of active hydrogens are provided by the different amino groups which are separated from each other by hydrocarbon groups and enable the amine to react with a number of epoxide groups with resulting cross-linking to give complex polyhydric phenol-amine-epoxy reaction products.

Such polyethylene polyamines can also be used to prepare higher molecular weight amines useful in the practice of this invention. For example, one mol of diethylene triamine may be amidified with one mol of rosin or one mol of long chain organic acid to give a product which has a plurality of active amino hydrogens per molecule since only one primary amine group would be used in reaction with one mol of acid.

The polyepoxides used for reaction with the polyhydric phenols contain two or more epoxide groups and are free from functional groups other than epoxy and hydroxyl groups. The simplest diepoxides will contain at least four carbon atoms, as in the case of 1,2-epoxy-3,4-epoxy butane. The epoxy groups may be separated from each other by ether groups or linkages as in the case of bis-(2,3-epoxy propyl) ether, bis-(2,3-epoxy 2-methyl propyl) ether, etc. The polyepoxides may also be of a somewhat more complex character such as those which result from the reaction of 2 or more mols of a diepoxide with 1 mol of a dihydric phenol, or the reaction of 3 or more mols of a diepoxide with 1 mol of a trihydric phenol, etc. Diepoxides or polyepoxides derived from polyhydric alcohols such as mannitol, sorbitol, erythritol or polyallyl alcohol may also be used. The polyepoxy compounds used may have varying structures and may be of complex structure so long as they do not contain groups which interfere with the reaction between the epoxide groups and the phenolic hydroxyl groups or amine groups.

The simpler diepoxides can be produced and obtained of a high degree of purity by fractional distillation to separate them from by-products formed during their manufacture. Thus, bis-(2,3-epoxy propyl) ether, diglycid ether, can be produced and separated by fractional distillation to give products of high purity, e. g., around 97% or higher as determined by the method of epoxide analysis hereinafter referred to.

Polyepoxides of higher molecular weight which are difficult to isolate by fractional distillation may be advantageously used if objectionable inorganic impurities and the catalyst have been removed, even though they are admixed with by-products such as monoepoxides, etc.

Valuable polyepoxides for use in making the new compositions can be obtained by the reaction of epichlorhydrin on polyhydric alcohols containing 3 or more hydroxyl groups. Thus, a trihydric alcohol such as glycerol or trimethylol propane can be reacted with epichlorhydrin in the proportions of 1 mol of trihydric alcohol to 3 mols of epichlorhydrin, using a catalyst which will promote a reaction of the epoxide group of the epichlorhydrin with a hydroxyl group of the alcohol, and with subsequent treatment of the reaction product to remove chlorine from the reaction product and to produce a polyepoxide. Such polyepoxides may contain, e. g., approximately 2 epoxy groups per molecule, even though 3 mols of epichlorhydrin are reacted with 1 mol of a trihydric alcohol. More complex or side reactions apparently take place which result in the production of products containing free hydroxyl groups or cyclic ring compounds or polymeric compounds which may be present in the resulting product. But such polyepoxide products can nevertheless advantageously be used as polyepoxides for reaction with amines and polyhydric phenols in forming the new compositions.

The polyepoxides used may contain small and varying amounts of admixed monoepoxides. To the extent that monoepoxides are present they will react with the polyhydric phenols to form terminal groups or residues containing hydroxyl groups and to the extent that such terminal hydroxyl groups are present the complex polyepoxides will contain both terminal epoxide-containing residues and terminal hydroxyl-containing residues. The presence of monoepoxides or of monoepoxy-hydroxyl compounds does not interfere with the production of the new products provided a sufficient amount of polyepoxides is present to serve as polyfunctional reactant with the amines and polyhydric phenols. The presence of monoepoxy hydroxyl compounds may be desirable and advantageous. During the final hardening operation and at higher temperatures the epoxy groups may react with hydroxyl or other groups to form more complex reaction products.

The new compositions made by the reaction of the polyfunctional phenols and amines with polyepoxides are complex reaction products. In the case where a dihydric phenol and a primary mono-amine react with a diepoxide, the reaction product might be considered to be a linear polymer in which the residues from the three reactants are all present, alternating with each other within the molecular chain. In the case where the reaction rate of the phenolic hydroxyl group of the polyhydric phenol and the amino hydrogen group with epoxide groups was the same under the reaction conditions such a polymeric product in the form of a linear polymer with the reactants alternating might be expected. However, the reaction rates of amines with epoxides varies, e. g., depending upon whether the amine is aromatic, aliphatic, etc. and whether the amine is a monoamine or a polyamine. Likewise the reaction rate of the phenolic hydroxyl group with an epoxide group will depend somewhat upon the structure of the polyhydric phenol used. Where the mixture of polyhydric phenol and amine contains a polyhydric phenol of low activity and a highly active amine, the amine is likely to react first and more or less completely before reaction of the polyhydric phenol with the polyepoxide is begun. In such cases a preliminary or intermediate reaction product of polyepoxide and amine may be first formed which will further react with the polyhydric phenol at a later stage of the process.

In general the proportions of polyhydric phenol, amine, and polyepoxide are such as to insure reaction of epoxide groups with both phenolic hydroxyl and amine groups, that is, the amount of polyepoxide should be in excess of that equivalent to the polyhydric phenol, and also in excess of that equivalent to the amine, considering one epoxide group of the polyepoxide equivalent to one phenolic hydroxyl group of the polyhydric phenol and to one active amine hydrogen. It is probable in most cases that simultaneous reaction of polyhydric phenols and amines with the polyepoxides will occur, although where the amine or the polyhydric phenol is more reactive it may be expected to react first or more rapidly while the less reactive reagent will react later or more slowly. The final reaction products will contain the polyepoxides reacted with both the polyhydric phenols and the amines in a complex reaction product or mixture.

A further reaction which may take place is that between epoxide groups and alcoholic hydroxyl groups. The polyepoxides may themselves contain reactive alcoholic hydroxyl groups; and when an epoxide group reacts with a phenolic hydroxyl group to form an ether linkage an alcoholic hydroxyl group is formed which is capable of reaction with an epoxide group. This reaction of alcoholic hydroxyls with epoxide groups may take place particularly during the final reaction or hardening or polymerization of the intermediate reaction products, particularly where an excess of polyepoxide is used initially and terminal epoxide groups are present in the intermediate reaction products.

It is not necessary, however, that all of the phenolic hydroxyl, amine and epoxide groups should react, since an exces of one or more of the reactants or incomplete reaction products may be present in intermediate reaction products or even in the final compositions.

The reaction conditions used in the practice of the invention may vary widely, depending upon the particular ingredients used, their proportions, and the nature of the intermediate or final reaction product desired. Since the reagents react by direct addition, simple heating of the reactants may be sufficient or in some cases the addition of a small amount of a catalyst may be helpful in promoting the reaction or in enabling it to take place at a lower temperature.

Where all three reactants, i. e., the polyhydric phenol, the amine and the polyepoxide are miscible with each other, either with or without heating, a liquid mixture may be directly produced and in such cases the reaction may be carried out by simply heating the liquid mixture with or without a catalyst until the desired degree of reaction has been obtained. Such liquid mixtures of reactants, capable of reaction on heating without the formation of byproducts, form valuable reaction mixtures for use in making coating compositions, molded articles, etc.

Where the reactants are insoluble or difficultly soluble in each other their reaction may be carried out by the use of solvents, particularly in the initial reaction stages. Thus, with relatively insoluble reactants such as melamine or certain high melting dihydric phenols, a solvent may be used to promote the reaction. With melamine as the reactive amine it may be heated with the polyhydric phenol and the polyepoxide with the addition of a small amount of water until a miscible reaction layer is formed after which the water may be removed and the partially reacted composition further reacted, e. g., as a molding composition or in solution in an organic solvent to form a varnish or coating composition. In certain cases it is desirable to use an organic solvent as the reaction medium.

The temperature and time required for carrying out the process will also depend upon the particular reactants used and the type of product desired. With highly reactive polyhydric phenols and highly reactive amines, short reaction times and low temperatures may be sufficient to cause the reaction to go to completion. With less reactive mixtures, longer periods of time, higher temperatures and in some cases catalysts are necessarily or advantageously used. In some cases it is desirable to form and isolate an intermediate reaction product which is still soluble and which may be used to give the final insoluble infusible product. In such cases it is sometimes desirable to heat the reaction mixtures without a catalyst to obtain the intermediate product or composition and to carry out the further conversion by heating in the presence of catalysts.

Products of different types and properties can be obtained depending upon the nature and proportions of the reagents used and on the reaction conditions. Valuable compositions are obtained when quantities of polyepoxide are used in excess of that necessary to react with all of the hydroxyl groups of the polyhydric phenols and all of the active hydrogens of the amine. In such cases the resulting composition will contain unreacted epoxide groups which are capable of further reaction with hydroxyl groups present in the composition to give the final infusible products.

Products of a somewhat different nature are obtained when the quantities of polyhydric phenols and amines used are in excess of that necessary to react with all of the epoxide groups. In such cases the resulting compositions will contain unreacted phenolic hydroxyl groups or unreacted amine groups or both. Such reaction products are desirable for further reaction with polyfunctional reactants capable of reacting with phenolic hydroxyl or amine groups such as added polyepoxides, diisocyanates, aldehydes and other coupling reagents.

It is also sometimes desirable and advantageous to use all of the reactants in equivalent quantities, that is, in quantities such that when the reaction is complete there will be little or no free phenolic hydroxyl groups or free amine groups or free epoxide groups in the final composition.

In the case of intermediate compositions it is desirable to carry out the reaction only part way and to produce incompletely reacted products which contain both unreacted epoxide groups and unreacted phenolic hydroxyl or unreacted amine groups or both such that the intermediate compositions are capable of further reaction to convert them to insoluble and infusible products.

The invention will be further illustrated by the following specific examples but it will be understood that the invention is not limited thereto.

The first two examples do not illustrate the new compositions of the invention but illustrate the preparation of special polyepoxides suitable for use in making the new compositions. Similarly, Example III describes the production of a particular complex polyhydric phenol suitable for use in making the new compositions. The preparation of the new compositions is illustrated by Examples IV to XII inclusive.

*Example I.*—In a reaction vessel provided with mechanical stirrer and external cooling means was placed 276 parts (3 mols) of glycerol and 828 parts (9 mols) of epichlorhydrin. To this reaction mixture was added 1 part of 45% boron trifluoride ether solution diluted with 9 parts of ether. The reaction mixture was agitated continuously. The temperature rose to 50° C. over a period of 1 hour and 44 minutes at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation this reaction mixture was gradually heated to 93° C. over a period of 1 hour and 51 minutes and held at this temperature for 8 hours and 49 minutes. After cooling to room temperature the inorganic material was removed by filtration. The dioxane and low boiling products were removed by heating the filtrate to 205° C. at 20 mm. pressure to give 261 parts of a pale yellow product.

This product can be distilled at temperatures above 200° C. at 2 mm. pressure provided it is sufficiently freed from impurities but unless care is taken it is liable to undergo a violent exothermic reaction. It is not, however, necessary to purify this product by distillation since such byproducts as are present do not interfere with the use of the product as a polyepoxide.

The epoxide equivalent of this product was determined by titrating a one gram sample with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering 1 HCl is equivalent to one epoxide group.

The epoxide equivalent represents the equivalent weight of the product per epoxide group. The epoxide equivalent so determined was 149. The molecular weight as determined by a standard boiling point elevation method was 324. This represents an average of 2.175 epoxide groups per molecule, assuming the determined molecular weight is the molecular weight. It is probable that the molecular weight is an average molecular weight of a product containing more than one reaction product. The average molecular weight is higher than that which would correspond to a product made up solely of the reaction product of 1 mol of glycerol with 3 mols of epichlorhydrin and it seems probable that complex reaction products are also formed, some of which may be of a polymeric or cross-linked nature. The product is, however, a valuable product for use as a polyepoxide in making the new compositions.

*Example II.*—By a procedure similar to that described in Example I, 1 mol of trimethylol propane and 3 mols of epichlorhydrin were condensed with boron trifluoride and finally treated with sodium aluminate to give 299 parts of a pale yellow liquid. The product had an equivalent weight to epoxide of 151 and an average molecular weight of 292.2.

This corresponds to approximately 1.94 epoxide groups per molecule, assuming an average molecular weight.

The product of this example can also be distilled at high temperatures and low pressures to give a water white liquid, but such further purification is not necessary and the product obtained can be directly used in making the new compositions. Or the purified product can be produced and similarly used.

The procedure of Examples I and II can be used in preparing complex polyepoxy products from other polyhydric alcohols containing 3 or more hydroxyl groups, for example, from higher molecular weight alcohols containing 3 hydroxyl groups or from higher polyhydric alcohols such as mannitol, sorbitol, erythritol or polyallyl alcohol. For example, a polyepoxide has been obtained from polyallyl alcohol and epichlorhydrin which contained 2.45 epoxide groups per average molecular weight. In general, with polyepoxides made by the reaction of epichlorhydrin on polyhydric alcohols containing 3 or more hydroxyl groups, the number of epoxide groups per molecule (based on average molecular weight) has been found to be materially less than that corresponding to 1 epoxide group per molecule of epichlorhydrin used; but in general polyepoxides can be so produced containing an equivalent of around 2 or more epoxide groups per molecule which are valuable polyepoxides for use in making the new compositions and reaction products of the present invention.

*Example III.*—A complex polyhydric phenol was prepared by the reaction of 3 mols of bis phenol and 2 mols β,β'-dichlorodiethyl ether with 8 mols of potassium hydroxide and 1000 parts of water. This reaction mixture was refluxed with continuous agitation for 48 hours. The water layer was removed by decantation and the resulting product was washed several times by agitation with boiling water to remove the excess potassium hydroxide and the potassium chloride formed as a byproduct of the reaction. The product was finally dried by heating with agitation until the temperature had risen substantially above the boiling point of water. A product softening (Durran's mercury method) at 70° C. was obtained.

*Example IV.*—A reaction mixture containing 193.8 parts of bis phenol, 15.68 parts of p,p'-diaminodiphenyl ether, and 130 parts of diglycid ether was heated at 185° C. for 15 minutes to give a resin softening at 90° C. Further heating of the reaction mixture for 15 minutes at the same temperature gave a product softening at 119° C. The same product heated another 15 minutes at the same temperature (total time 45 minutes) gave an infusible product.

This example illustrates the production of intermediate compositions which may be further heated to give infusible products. Such intermediate products may be heated in the form of a molded object or they may be dissolved in organic solvents, spread in thin films and converted to give infusible protective coatings.

*Example V.*—A mixture of 130 parts of diglycid ether, 135 parts of 4,4'-dihydroxydiphenyl methyl butyl methane and 20 parts of diethylene triamine were mixed together and warmed with agitation until a complete solution was obtained. A portion of this product was converted in a molding form by heating for 1 hour at 150° C. to give an infusible product. Likewise a thin film of .003 inch thickness was baked for one hour at the same temperature to give an infusible film. A similar film air dried at room temperature for 24 hours gave a flexible product.

*Example VI.*—A reaction mixture of 125 parts of p,p'-dihydroxydiphenyl sulfone, 130 parts of diglycid ether and 52½ parts of benzyl amine gave conversion to an infusible product when heated for one-half hour at 150° C. both in a molding form and as a thin film.

*Example VII.*—A reaction mixture of 42 parts of phloroglucinol, 324 parts of the product of Example I, 28½ parts of allyl amine and 19 parts sodium hydroxide was heated one-half hour in a molding form at 150° C. to give an infusible product.

*Example VIII.*—A mixture of 134 parts of 4,4'-dihydroxydiphenyl-1,1-cyclohexane (a phenol derived from the condensation of 2 mols of phenol with 1 mol of cyclohexanone), 92 parts of lauryl amine, 292 parts of the product of Example II, and 25 parts of 10% sodium hydroxide when spread in thin films converted to give a flexible product when heated for one-half hour at 150° C.

*Example IX.*—A mixture of 57 parts of bis phenol, 195 parts of diglycid ether, 46½ parts of aniline and 15 parts of sodium hydroxide converted to an infusible product when heated for one-half hour at 100° C. in a molding form.

*Example X.*—A mixture of 107 parts of 4,4'-dihydroxybenzophenone, 165 parts of diglycid ether, 28½ parts of allyl amine, and 6 parts of sodium hydroxide, when heated for one-half hour at 150° C. both in a molding form and as a thin film, converted to infusible products.

*Example XI.*—A reaction mixture of 412 parts of the product of Example III, 292 parts of the product of Example II, and 29 parts of hexamethylene diamine likewise converted to infusible products when heated for ½ hour at 150° C. both in a molding form and as a thin film.

*Example XII.*—A mixture of 5.7 parts of bis phenol, 6.5 parts of diglycid ether, 1 part of melamine and 25 parts of water was heated at 100° C. for one-half hour at which time the reactants had formed a homogenous organic layer. The water layer was removed by decantation and the resinous organic layer was dried by heating to a temperature substantially above the boiling point of water. The resulting organic product was dissolved in a ketone solvent and treated with 2% on the weight of resin solids of mono-potassium bis phenoxide to give a varnish which when spread in thin films gave extremely hard and flexible products when heated for one-half hour at 110° C. The purpose of the water as used in this example illustrates the use of a solvent as a reaction medium. Melamine is a relatively insoluble reactant, but it has slight solubility in hot water so that an equilibrium exists between the soluble and insoluble portions enabling the reaction to proceed smoothly.

The above examples all illustrate proportions of polyhydric phenol, amine and polyepoxide such as to insure reaction of epoxide groups with both phenolic hydroxyl and amine groups; the number of epoxide groups of the polyepoxide being in excess of the number of phenolic hydroxyls of the polyhydric phenol and also in excess of the number of active amine hydrogens. The proportions of polyepoxide and polyhydric phenol vary from a small excess of polyepoxide in Example 4, where the ratio of epoxide groups of the polyepoxide to phenolic hydroxyl groups is about 2 to 1.7, or 1.18 to 1, to a large excess of polyepoxide, as in Example 9, where the ratio of epoxide groups to phenolic hydroxyl groups is about 6 to 1. The proportions of polyepoxide and amine vary in the above examples from an amount of polyepoxide less than twice that equivalent to the amine, as in Example 8, where the ratio of epoxide groups of the polyepoxide to active amine hydrogen is about 1.935 to 1, to a large excess of polyepoxide as illustrated in Example 4, where the ratio of epoxide groups of the polyepoxide to active amine hydrogen is about 2 to 0.3, or a ratio of about 6.4 to 1.

The proportions of polyhydric phenol and amine vary in the above examples from an amount of polyhydric phenol approximately half that equivalent to the amine (considering 1 phenolic hydroxyl equivalent to 1 active amine hydrogen) to an amount of polyhydric phenol greatly exceeding the amine as in Example 4 where the amine is less than one-fifth the equivalent amount of polyhydric phenol (approximately 5.4 phenolic hydroxyl groups to 1 active amine hydrogen).

Certain of the above examples illustrate equivalent or approximately equivalent proportions of reagents, that is, proportions of polyepoxide equivalent to the polyhydric phenol plus amine, as in Examples 4, 5, 6 and 12. A small excess of polyepoxide is illustrated in Example 7 where the proportions are approximately 2.18 epoxide groups of the polyepoxide to 1 phenolic hydroxyl of the polyhydric phenol and 1 active amine hydrogen; a larger proportion is illustrated in Example 10, 2.5 epoxide groups to 1 phenolic hydroxyl and 1 active amine hydrogen; and Example 9 illustrates a much larger excess of polyepoxide (6 epoxide groups to 1 phenolic hydroxyl and 2 active amine hydrogens). Less polyepoxide than that corresponding to the polyhydric phenol and amine is illustrated in Examples 8 and 11, the proportions in Example 8 being about 1.935 epoxide groups to 1 phenolic hydroxyl and 1.00 active amine hydrogens; or a ratio of epoxide to phenolic hydroxyl plus active amine hydrogen of about 1.935 to 2.00. Thus the ratio of polyepoxide to polyhydric phenol plus amine in the above examples varies from less than the equivalent amount of polyepoxide to twice the equivalent; the proportions of polyepoxide to polyhydric phenol vary from a small excess of polyepoxide to about six times the equivalent amount; the proportions of polyepoxide to polyfunctional amine vary from less than twice the equivalent amount to more than six times the equivalent amount; and the proportions of polyhydric phenol and polyfunctional amine vary from about one-half the equivalent amount to more than five times the equivalent amount.

The new compositions of the present invention are valuable products in the manufacture of varnishes, molding compositions, adhesives, etc., being capable of reaction or polymerization to give products varying from hard, brittle, fusible solids to hard, non-brittle, infusible solids and giving polymerization and reaction products containing a number of hydroxyl groups. The presence of these hydroxyl groups, with the other properties of the reactants, give the converted products high adhesion to surfaces.

It is a characteristic of the process of the invention and the production of the new compositions that no byproducts are formed and that the reaction in general takes place in a dry state by the direct addition of phenolic hydroxyl groups and amine groups to the epoxide groups. Accordingly, the reaction can be carried out by using the initial ingredients in solution in organic solvents or in molding compositions, and carrying out the reaction after the solution has been applied as a film or to the molding composition in the mold, with heating to remove the solvent and to affect the reaction to form the final reaction product.

By using the polyhydric phenol and the amine in approximately equivalent proportion to the polyepoxide, or with an excess of the polyepoxide, a molding mixture can thus be made which will give a final insoluble, infusible molded article.

Where the new complex compositions are prepared from mixtures containing an excess of the polyepoxide over that required to react with all of the active hydrogen groups present in the polyhydric phenol and the amine, such that the intermediate reaction products contain unreacted epoxide groups, such compositions may be advantageously used by adding compounds containing active hydrogen which will couple with or react with the epoxide groups. Among such compounds may be mentioned amines, phenol, amides, mercaptans, polyhydric alcohols, polyimines, etc. A wide variety of valuable reaction products can thus be obtained. Where the added compounds are polyfunctional reactants they may serve to cross-link different molecules through the terminal epoxide groups and in some cases through intermediate hydroxyl groups. By using a polyfunctional reactant that reacts with epoxide groups but not with hydroxyl groups, in proportions approximately equivalent to the epoxide groups, cross-linking of different molecules may be obtained as in the final hardening reaction. Where cross-linking reagents are used that react with hydroxyl, or with both hydroxyl and epoxide groups, a different and somewhat more complex composition may be obtained. The use of less than the equivalent amount of cross-linking reagents enables modified products to be obtained which may be fusible or infusible products or compositions.

Where the new compositions are made with the use of polyepoxides in proportions less than that equivalent to all of the active hydrogens present in the polyhydric phenols and amines, the intermediate or final products may contain free phenolic groups or free amine groups in addition to the alcoholic hydroxyl groups. Such products at an intermediate stage may be used with various cross-linking reagents which will react with the phenolic or amine groups to give more complex products. For example, in such cases, small amounts of polyepoxides can be added to the intermediate products to react with any excess phenolic hydroxyl or amine groups.

The intermediate products may be thus produced which are themselves capable of reaction, without the addition of cross-linking reactants, to form final infusible products on further heating. Other intermediate products may be advantageously used with added polyfunctional cross-linking reactants which will react with excess epoxide groups or amine groups or phenolic hydroxyl groups or alcoholic hydroxyl groups. Other cross-linking reactants which can be so used to convert intermediate products into high molecular weight products or final infusible products include diisocyanates, for example, methylene bis(4-phenyl) isocyanate, dialdehydes, e. g., glyoxal, dimercaptans, polyamides, etc.

Thus the present invention provides new compositions and new reaction products which are valuable as raw materials in the manufacture of varnishes, molding resins, adhesives, fibers, filaments, etc. In general they are capable of polymerization, particularly in the presence of catalysts and by the use of cross-linking reactants, and even in some cases without catalysts or cross-linking reactants to form insoluble, infusible final products. Where the further reaction or polymerization of the complex epoxide containing compositions takes place through reaction of epoxide and hydroxyl groups, the final reaction or polymerization products may be free or relatively free from epoxy groups and contain only or mainly hydroxyl groups in addition to hydrocarbon residues, ether linkages and carbon nitrogen linkages.

The compositions of the present invention vary from liquid products to solids which may be fusible or infusible. In general the new complex compositions and reaction products react and polymerize to give final products which contain a high percentage of hydroxyl groups. The final and fusible reaction and polymerization products made according to the present invention have a remarkable combination of desirable qualities including resistance to water, solvents, alkalies and acids, toughness, flexibility, adhesion to surfaces, wettability to most pigments enabling them to be used in the manufacture of pigmented paints and enamels, and hardening of thick films through chemical reactions within the film itself when a suitable catalyst or cross-linking reactant is used so that paint and varnish coatings far beyond the usual thickness can be applied.

I claim:

1. Amine-epoxy-phenol compositions containing substantial amounts of a polyepoxide free from functional groups other than epoxy and hydroxyl groups, a polyhydric phenol free from functional groups other than phenolic hydroxyl groups and a polyfunctional amine containing a plurality of active amine hydrogens, the proportion of epoxide groups of the polyepoxide being in excess of that equivalent to the phenolic hydroxyl groups of the polyhydric phenol and also in excess of that equivalent to the active amine hydrogens of the polyfunctional amine, and the amounts of polyhydric phenol and polyfunctional amine together being such that the phenolic hydroxyls of the polyhydric phenol and the active hydrogens of the amine together are more than half the equivalent of the epoxide groups of the polyepoxide.

2. Amine-epoxy-phenol compositions containing substantial amounts of a polyepoxide free from functional groups other than epoxy and hydroxyl groups, a polyhydric phenol free from functional groups other than phenolic hydroxyl groups and a polyfunctional amine containing a plurality of active amine hydrogens, the proportion of epoxide groups of the polyepoxide being in excess of that equivalent to the phenolic hydroxyl groups of the polyhydric phenol and also in excess of that equivalent to the active amine hydrogens of the polyfunctional amine, and the amounts of polyhydric phenol and polyfunctional amine together being such that the phenolic hydroxyls of the polyhydric phenol and the active hydrogens of the amine together are not less than half the equivalent of the epoxide groups of the polyepoxide and do not greatly exceed the equivalent amount.

3. Amine-epoxy-phenol compositions containing substantial amounts of a polyepoxide free from functional groups other than epoxy and hydroxyl groups, a polyhydric phenol free from functional groups other than phenolic hydroxyl groups and a polyfunctional amine containing a plurality of active amine hydrogens, the proportions of polyepoxide and polyhydric phenol being such that the polyepoxide contains at least about 1.18 epoxide groups for each phenolic hydroxyl group of the polyhydric phenol and not in excess of about 6 epoxide groups for each phenolic hydroxyl group.

4. Amine-epoxy-phenol compositions containing substantial amounts of a polyepoxide free from functional groups other than epoxy and hydroxyl groups, a polyhydric phenol free from functional groups other than phenolic hydroxyl groups and a polyfunctional amine containing a plurality of active amine hydrogens, the proportions of polyepoxide and polyfunctional amine being such that the number of epoxide groups of the polyepoxide for each active amine hydrogen is within the range of about 1.935 to 6.4.

5. Amine-epoxy-phenol compositions containing substantial amounts of a polyepoxide free from functional groups other than epoxy and hydroxyl groups, a polyhydric phenol free from functional groups other than phenolic hydroxyl groups and a polyfunctional amine containing a plurality of active amine hydrogens, the proportions of polyepoxide to polyhydric phenol plus polyfunctional amine varying from somewhat less than the equivalent proportions to approximately twice the equivalent proportions, and the proportions of polyepoxide to polyhydric phenol varying from somewhat more than the equivalent proportions to about six times the equivalent proportions, considering one epoxide group of the polyepoxide equivalent to one phenolic hydroxyl group of the polyhydric phenol and one active amine hydrogen.

6. Amine-epoxy-phenol compositions containing substantial amounts of a polyepoxide free from functional groups other than epoxy and hydroxyl groups, a polyhydric phenol free from functional groups other than phenolic hydroxyl groups and a polyfunctional amine containing a plurality of active amine hydrogens, the proportions of polyepoxide to polyhydric phenol plus polyfunctional amine varying from somewhat less than the equivalent proportions to approximately twice the equivalent proportions, the proportions of polyepoxide to polyhydric phenol varying from somewhat more than the equivalent proportions to about six times the equivalent proportions, and the proportions of polyepoxide to polyfunctional amine varying from somewhat less than twice the equivalent proportions to more than six times the equivalent proportions, considering one epoxide group of the polyepoxide equivalent to one phenolic hydroxyl group of the polyhydric phenol and one active amine hydrogen.

7. Amine-epoxy-phenol compositions containing substantial amounts of a polyepoxide free from functional groups other than epoxy and hydroxyl groups, a polyhydric phenol free from functional groups other than phenolic hydroxyl groups and a polyfunctional amine containing a plurality of active amine hydrogens, the amount of polyepoxide being approximately equivalent to the amount of polyhydric phenol plus polyfunctional amine, considering one expoxide group of the polyepoxide equivalent to one phenolic hydroxyl of the polyhydric phenol and one active amine hydrogen.

8. Compositions as defined in claim 1 in which the polyfunctional amine is an aliphatic polyamine.

9. Intermediate reaction products resulting from the partial reaction of the composition of claim 1, containing direct addition-reaction products of the polyepoxides with the polyhydric phenols and polyfunctional amines.

10. Intermediate reaction products resulting from the partial reaction of the composition of claim 1, containing direct addition-reaction products of the polyepoxides with the polyhydric phenols and polyfunctional amines, said intermediate reaction products having terminal epoxide groups.

11. Infusible articles and compositions containing infusible products of direct addition-reaction of the composition of claim 1.

12. The method of forming plastic compositions which comprises heating to cause direct addition-reaction of the polyepoxide with the polyhydric phenol and polyfunctional amine of claim 1.

SYLVAN OWEN GREENLEE.

REFERENCES CITED

The following references are of record in the file of this patent:

UNITED STATES PATENTS

| Number | Name | Date |
| --- | --- | --- |
| 2,136,928 | Schlack | Nov. 15, 1938 |
| 2,213,477 | Steindorff et al. | Sept. 3, 1940 |
| 2,324,483 | Castan | July 20, 1943 |